Patented Mar. 20, 1934

UNITED STATES PATENT OFFICE 1,951,449

PROCESS OF REDUCING AND ALLOYING METALS

William H. Smith, Detroit, Mich., assignor to General Reduction Corporation, Detroit, Mich., a corporation of Delaware No Drawing. Application June 6, 1929, Serial No. 369,003

14 Claims. (Cl. 75—45)

This invention relates to a process of alloying metals, and has to do particularly with a process of alloying iron with other metals by reduction of their oxides in combination with finely divided iron and a reducing agent.

More specifically, the present invention relates to a process whereby the alloying with the iron is accomplished by mixing the alloying oxide directly with the finely divided iron and retaining this mixture as a mass by compressing, sintering, or by enclosing the same in a suitable container, instead of adding the alloy separately to molten metals as has been the custom in the past. To accomplish this alloying by a direct use of the oxides of the alloying elements, I preferably utilize sponge iron or finely divided iron with carbon or other reducing agent and mix such iron and carbon or agent with the oxide of the particular alloying element or elements to be used.

The mixture may then be briquetted or sintered to form a comparatively solid mass, and then subjected to heat, sufficient to cause reaction within the briquet and a reduction of the alloy oxide or oxides before the mass becomes liquid or molten. After the reduction of the alloy, the briquet or mass may, if desired, be subjected to further heat and pressure whereby to cause a complete fusing and closing in of the mass, or may be subjected to still further heat to melt the mass into a liquid alloy form.

It will be obvious that this process of alloying metals is unusually broad in scope in view of the many variations and modifications that can be accomplished.

In carrying out my process, I preferably utilize what is known as sponge iron, which may be obtained by subjecting iron ore to a reducing temperature in the presence of a suitable reducing agent, whereby the iron oxide is reduced without melting. Such an apparatus and method for forming sponge iron is described in my Patent No. 1,692,587 dated November 20, 1928, and my pending application Serial No. 180,746, filed April 4, 1927.

While I prefer to use sponge iron, fine grey iron, iron or steel of any divided form that will compress, or sinter, or be contained in a finely divided mass, may be used. I prefer to use sponge iron as produced in reduction ovens and when such sponge iron is used, with carbon as a reducing agent, the carbon may be combined therein as combined carbon, or may be contained as free carbon and added separately in predetermined amounts. However the carbon or other reducing agent may be added, it is present in a predetermined amount in the sponge iron or other form of iron suitable to the particular conditions required. To this mixture of finely divided iron, I preferably add an oxide of an alloy or alloys such as chromium, silica or manganese oxide, and if necessary, other reducing forms also other reducible elements, and the entire mixture is then briquetted, sintered, or contained in a mass which is comparatively well divided. The reducing agents are held mechanically in the structure and throughout the mass, and the mass is subjected to sufficient temperature to cause reaction and reduction of the unreduced elements desired.

In carrying out this reduction of the alloying mixtures, I preferably bring the briquets or mass to sufficient temperature to cause the mass to congeal or sinter to obtain intermediate contact and complete reduction within the mass. The method of reducing and forming the alloys will vary considerably under different conditions and according to the results desired, but it will be understood that during the reduction of the alloying oxide or oxides that such oxides will be reduced and all or part of the gases formed will pass out through the outer surface of the briquet or mass, or through the metal in case the mass is brought to a melting temperature, depending upon the results desired.

It is usually preferable to complete the reduction of any unreduced iron oxides, that might be present or added in the mass in this same process of alloying. Undesirable ingredients which might be present, such as lime and magnesia may be unreduced and carried off with certain foreign elements and easily removed by melting and as slag. In subsequent operations, the alloying metal and mass being brought up to the proper temperature and condition, it may be subjected to suitable pressure so as to close in and lock the iron particles and alloying metal particles.

For example, the briquet or mass may be formed of a mixture of finely divided iron, $MnO_2$ and C, (or subjected to $H_2$) and the same brought up to a temperature which will preferably cause reaction to form metallic manganese. The metallic manganese will be scattered throughout the mass or will be segregated in one particular part thereof as desired, but the temperature will be such that the reduced metals will be wet or will adhere after which suitable pressure will close in the grains and lock the mass.

The alloying oxide or oxides in the mass of fine mixture may also be reduced with other metals, as for instance, chromium oxide may be reduced with silicon in accordance with the following formula:

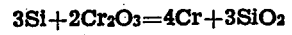
$$3Si+2Cr_2O_3=4Cr+3SiO_2$$

The reduction of substantially all the oxides within the mass takes place at temperatures less than the melting point of iron. For instance, $SiO_2$ will reduce and alloy at 2200° F. within the mass, while it will only reduce at 2600° F. outside the mass. Chromium oxide $Cr_2O_3$ will reduce at 2165° F. within the mass, and $MnO_2$ will reduce at 1868° F. within the mass. While high temperatures up to the melting point of the mass may be used, such high temperatures are not necessary to obtain complete reduction of the oxides referred to, it being understood here that the reducing temperatures of any particular oxides will be less than the melting temperature of iron.

This novel process of reducing an alloy is also particularly important in making it possible to have a ferro silicate present in one part of the final article to be formed. For instance, I may form one part of the briquet, mass, or bar, or the article to be formed of sponge iron containing the following ingredients:

$$Fe + SiO_2 + 2C$$

and subject such mass to a temperature of approximately 2500° F. whereby the following reaction will be obtained:

$$FeSi + 2CO$$

the important point of this reaction being the formation of the ferro silicate (FeSi), or like ferro alloys of manganese, chromium, etc.

At a temperature of approximately 2600° F. the following reaction may be obtained:

$$FeO + SiO_2 = FeSiO_3$$

or $$FeSiO_3 + CaO = CaSiO_3 + FeO$$

Thus in one part of the article formed there may be a ferro silicate or a ferro calcium silicate present which will give this part of the article the properties of wrought iron. While the present application is not directed to the production of wrought iron per se, it will be understood that in forming a portion of the article of wrought iron that I prefer to add CaO to that portion of the sponge iron in addition to the other ingredients above noted, so as to form a calcium silicate slag which is viscous below the melting point of the iron.

After the alloying elements in the briquet or article are reduced, the excess ingredients will be forced out to the surface as the mass or article sinters and such forced out ingredients may be removed or broken off. The application of pressure in forming the article will also serve to squeeze out slag or excess ingredients.

It will be understood that the alloying carried out in this process is preferably carried out in the presence of a reducing gas. It will also be understood that the inherent characteristics of any alloying article formed may be considerably varied by segregating the alloying metal or metals in varying degrees of density throughout the article. For instance, by the present process I am able to form an article which in one part may be formed of an alloy of manganese and iron while in another part it may be formed only of iron. Thus it will be possible to have an article having separate parts formed of an alloy, a metal, or any combination of alloys with or without carbon.

It will be obvious that it would be possible in the present invention to produce an article proportioned to have parts thereof formed of wrought iron, an alloy or alloys, and various grades of iron from a high carbon iron to grey iron. The idea of proportioning ingredients of different kinds and densities in different parts of an article which is formed without melting is disclosed in my pending application No. 166,268 filed February 5, 1927, and the present application which is a continuation in part thereof relates to improvements along this line, particularly wherein the article is formed by reducing and alloying within the mass.

It will be seen that by combining finely divided iron with the proper reducing agents and alloying oxides and forming the same into a mass and subjecting the same to a temperature below the melting point of iron that I am able to have silicates present, as in the case of forming wrought iron, or I am able to directly reduce the alloying oxides contained in such mass to effect true alloys with the iron without melting. The mixing of the alloy oxides with the comparatively cold finely divided iron and forming the same into a mass makes possible this reaction and alloying as contrasted with the placing of alloy oxides in molten iron whereby they will float to the top instead of combining with the metal.

It will be understood that when carbon is used as a reducing agent that $CO$ and $CO_2$ comes off as a gas, but when a metal is used as a reducing agent, slag is formed which may or may not be taken off as desired. In carrying out the present process, after the "mass" is heated to the reducing temperature of the alloy agent, below the melting temperature of the iron, then the iron will be "wet" and will absorb the alloy or alloys, and if the mass is not carried to a melting temperature, then it may be subjected to various squeezing pressing or melting steps to close in the grains and complete and fix the alloy according to requirements.

It will be understood that the finely divided iron used in the mass or briquet, in carrying out the present process, embodies a small portion of $SiO_2$ or silica, and such being the case I preferably add an excess of carbon in forming the briquet or mass for the purpose of reducing the silica and forming in the resultant reduced mass both silicon (Si) and carbon.

What I claim is:

1. The steps in the process of alloying iron with other elements which consists in directly combining finely divided metallic iron and a separate reducing agent with the oxide of the alloying element or elements in the form of a mass, said oxide containing all the elements required for the finished alloy, subjecting the mass to temperature less than the melting point of the iron and for a length of time sufficient to reduce the oxides and sinter the mass before appreciable alloying takes place, and then subjecting the sintered mass in the presence of a reducing gas to an alloying temperature greater than the melting temperature of the alloying elements.

2. The steps in the process of alloying iron with other elements which consist in directly combining finely divided metallic iron with an excess of the oxide of the alloying element and an excess of solid reducing agent in the form of a mass, subjecting the mass to temperature less than the melting point of the iron but sufficient to sinter the mass and reduce the oxide, forcing excess ingredients to the surface of the mass, and then subjecting the mass to pressure to close in the grains and form the finished article.

3. The method of alloying iron with other elements, which comprises combining finely divided iron, reduced without melting, with the oxide or oxides of one or more other elements together with a separate solid reducing agent, each oxide containing sufficient elements for the complete alloy, briquetting the mixture to form a self-contained mass, then subjecting such mass to a temperature sufficient to reduce the oxides but less than the melting point of the iron, and then subjecting the reduced mass to a temperature sufficient to allow all the reduced elements in the presence of a reducing gas.

4. The method of combining iron with other elements, which comprises mixing the desired proportion of finely divided reduced iron with an excess of the oxide of the other element or elements, adding a reducing agent, forming the same into a self-contained mass, sintering and reducing said oxide while still contained in said mass at a temperature less than the melting point of the iron, forcing excess ingredients to the surface of the mass, and then subjecting the reduced mass to a temperature sufficient for alloying and melting.

5. The method of combining iron with other elements, which consists in mixing the desired proportion of finely divided reduced iron with the finely divided oxide of the other element or elements and an excess of reducing agent, forming the same into a self-contained mass, reducing said oxide while still contained in said mass at a temperature less than the melting point of the iron, forcing excess ingredients to the surface of the mass, and then subjecting the iron and reduced element in the presence of a reducing atmosphere to an alloying temperature and pressure whereby to close in the grains to form the finished article.

6. The process of combining alloying elements with iron, which comprises mixing finely divided iron as the predominating element with the complete amount of finely divided oxide of the alloying element and an excess of reducing agent, subjecting the combined mixture and reducing agent to a temperature sufficient to sinter and then reduce the oxide, forcing excess ingredients to the surface of the mass and then subjecting the mixture while still at approximately the reducing temperature, but less than the melting temperature of the iron, to pressure whereby to close in the grains and form the final article.

7. The process of forming alloys in which iron is the predominating element, which consists in directly mixing the oxides, of the alloying elements with finely divided iron and an excess of reducing agent, forming the same in a self-contained mass and subjecting said mass and reducing agent to a temperature less than the melting point of iron but sufficient to reduce the oxides forcing excess ingredients to the surface of the mass, subjecting the reduced mass to an alloying temperature and finally forming the alloy article at that temperature.

8. The process of forming an article made up of a compound of elements having varying densities and characteristics, which consists in mixing finely divided iron and a solid reducing agent with the finely divided oxides of other elements of predetermined proportions and densities relative to the finely divided iron, subjecting such mixture to a temperature sufficient to reduce the oxides and form the mixture into a sintered mass, and then subjecting the mixture to temperature and pressure whereby to close in the grains and fix the predetermined proportions and densities of the various elements.

9. The process of alloying iron with other elements which consists in mixing a predominating portion of finely divided iron with the oxides of the alloying elements and an excess of carbon, subjecting the mixed mass to a temperature less than the melting temperature of iron but sufficient to form CO and $CO_2$ and first reduce the oxides and sinter the mass forcing excess ingredients to the surface of the mass, and then cause the reduced alloying elements to become alloyed with the iron in the presence of a reducing atmosphere.

10. The process of forming an alloy article which consists in associating finely divided iron and carbon with the oxide of an alloying element, mixing the iron and oxide whereby the relative density of the iron and the oxide will vary, subjecting the mass to sufficient temperature to form CO and $CO_2$ and reduce the oxide and sinter the mass, and then subjecting the mass to alloying temperature and pressure whereby to directly form a finished article having a varying predetermined density of iron and iron alloy.

11. The method of forming an article made up in part of iron, wrought iron, and an alloy, which consists in mixing together finely divided reduced iron with the oxide of the alloying element in the required proportions and densities, mixing a reducing agent with the oxide, mixing a small percentage of gangue with a portion of the finely divided iron, subjecting the mass to a temperature less than the melting point of iron but sufficient to sinter the mass and reduce the oxide and form a ferro silicate in a part of the iron mass, and then subjecting the mass to pressure and the alloying temperature of said element whereby to close in the grains and form the final article.

12. That step in a process of forming an iron alloy by reducing the oxides of the alloying elements in the presence of finely divided iron and $SiO_2$ without melting the iron, which consists in adding an excess of carbon before subjecting the mixture to reducing temperature whereby to reduce said silica to form silicon and carbon in the finally reduced mass.

13. The process of forming alloys in which iron is the predominating element, which consists in directly mixing the oxides of the alloying elements with finely divided iron, a reducing agent, and an excess of carbon, forming the mixture into a briquet, said mixture containing $SiO_2$ and then subjecting said briquet to a temperature less than the melting point of iron but sufficient to reduce the oxides, the excess of carbon being added to reduce the $SiO_2$ present in the briquet whereby to form Si and carbon in the reduced mass.

14. The process of forming an alloy article which consists in associating finely divided iron with the oxide of an alloying element, mixing the iron and oxide whereby the relative density of the iron and oxide will vary to present a mass having varying cross sectional characteristics, adding a reducing agent, subjecting the mass to sufficient temperature to reduce the oxide and sinter the mass, and then subjecting the mass to an alloying temperature and pressure in the presence of a reducing gas whereby to directly form a finished article having a varying predetermined density of iron and iron alloy.

WILLIAM H. SMITH.